United States Patent [19]

Lechner et al.

[11] Patent Number: 4,715,058
[45] Date of Patent: Dec. 22, 1987

[54] PROTECTIVE CIRCUIT FOR THE OVERVOLTAGE PROTECTION OF A SUBSCRIBER LINE INTERCONNECT CIRCUIT

[75] Inventors: Robert Lechner, Otterfing; Hans-Werner Rudolf; Roland Krimmer, both of Munich, all of Fed. Rep. of Germany

[73] Assignee: Siemens Aktiengesellschaft, Berlin & Munich, Fed. Rep. of Germany

[21] Appl. No.: 20,809

[22] Filed: Mar. 2, 1987

[30] Foreign Application Priority Data

Apr. 23, 1986 [DE] Fed. Rep. of Germany ....... 3613721

[51] Int. Cl.$^4$ .......................... H04M 7/00; H02H 3/20
[52] U.S. Cl. ...................................... 379/27; 379/412; 370/13; 361/91; 361/119
[58] Field of Search ................. 379/27, 22, 26, 29, 379/412; 370/13, 14, 16; 361/91, 119

[56] References Cited

U.S. PATENT DOCUMENTS 4,254,442  3/1981  Dijkmans et al. ............... 361/91 X
4,585,905  4/1987  Brown ................................ 379/412
4,661,979  4/1987  Jakab ............................. 361/119 X Primary Examiner—Stafford D. Schreyer
Attorney, Agent, or Firm—Jeffrey P. Morris

[57] ABSTRACT

A protective circuit for the electronic interface circuit (SLIC) as well as the electronic switches for test access is described, in which a first threshold setting element for each conductor of the core pair is connected between the line side and a test access and/or isolation switch and the test access switch for the related first conductor of the core pair, for conducting overvoltages to ground, as well as a second threshold setting element bridging access switch which is connected to ground via a third threshold setting element.

5 Claims, 2 Drawing Figures

PROTECTIVE CIRCUIT FOR THE OVERVOLTAGE PROTECTION OF A SUBSCRIBER LINE INTERCONNECT CIRCUIT

CROSS REFERENCE TO RELATED APPLICATIONS

1. Peter Vaclavik, case U.S. Ser. No. 020,814, Circuit Arrangement For The Connection of Line Circuits of a Digital Time Multiplex-Telephone Network, filed on Mar. 2, 1987 and assigned to the same assignee as the present application.

2. Robert Lechner, et al. case U.S. Ser. No. 020,636, Protective Circuit for the Overvoltage Protection of a Subscriber Line Interconnect Circuit, filed on Mar. 2, 1987 and assigned to the same assignee as the present application.

BACKGROUND OF THE INVENTION

1. Field of the Invention

The invention relates to a protective circuit for the overvoltage protection of a subscriber line interconnect circuit of a digital time multiplex-communication network, specifically, to a telephone network which includes an electronic interface circuit. More particularly, the invention relates to the overvoltage protection of the electronic switches associated with the subscriber line circuit for test accessibility, through which, each conductor of a core pair of the connected subscriber line circuit for each corresponding connection of the subscriber line interconnect circuit has provided an isolation of the separate conductors of the core pair from the connected subscriber line circuit. A separate test access connection to the conductors of the core pair and/or to the corresponding connections of the active subscriber line interconnect circuits is provided.

2. Description of the Prior Art

Protective circuits are necessary since the interface circuit of subscriber line interconnect circuits is comprised of electronic circuit elements, as are the circuits for test accessibility. Prior art subscriber line interconnect circuits, in which the interface circuit have repeating coils and voltage stable resistors, and in which test accessibility was accomplished by means of electromagnetic relays, can withstand overvoltages in the order of 1kV without damage, so that a protective circuit is redundant.

A protective circuit must meet the requirement that the resistance symmetry imposed upon the core pairs must remain unaffected. Furthermore there must be assurance that in the event of a current interruption resulting from a malfunction, it may be ascertained, at the subscriber interconnect circuit, whether this defect is a result of a subscriber line interconnect circuit itself, or of a defect in the protective circuit.

SUMMARY OF THE INVENTION

According to the invention, a protective circuit is provided with a threshold setting element for a conductor of a core pair, connected between the line side of the said isolation switch and the access switch for accessing the threshold setting element, of identical construction to that associated with the other conductor of the core pair, by means of which overvoltages are conducted to a ground connected circuit terminal, as well as through a second threshold setting element bridging the access switches for accessing the line core pair, which may be connected to ground potential via a third threshold setting element.

In the circuit of the invention, the threshold setting element providing primary protection is implemented through a relatively low ohmic resistance inserted into the line core pair and a thyristor diode located between a connection of this resistance and a ground connected terminal of the circuit, is so arranged that, when the said resistance, which may at times also be designed as a fusing resistance, is burned out, it may still be established with the aid of the test access for monitoring the subscriber line interconnect circuit, that a current interruption in the subscriber line circuit is due to a malfunction of this resistance and not to an interruption of the subscriber line circuit, or a short circuit of the core pair of the subscriber line circuit. Because of the identical construction and the identical method of connection, the conditions of symmetry are assured.

Additional protective elements provide assurance that the access switch for testing the subscriber line circuit is also protected against overvoltages although it is not afforded protective action by the first threshold setting element.

In accordance with a further embodiment of the invention, the third threshold setting element is provided for a number of subscriber line interconnect circuits in common, in view of cost savings.

A thyristor diode is preferably employed as the response threshold determining element.

In accordance with a further embodiment of the invention, an additional threshold setting element is connected on the subscriber line interconnect circuit side of the respective access switch for accessing the subscriber line interconnect circuit, the response threshold of which lines below the response threshold of the remaining threshold setting elements.

The response threshold of the true protective circuit must not be set so low that it will prevent damage to the elements in the interface circuit in every case. The reason is that the alternating ringing voltage that is impressed on the subscriber line circuit may under some circumstances appear with considerable amplitude. The response threshold of the protective circuit and correspondingly the breakdown voltage of the access switch must be high enough that the protective circuit is not activated and also that there need be no concern over a malfunction of the access switches. No particular requirements are imposed on the switch elements of the interface circuit, since the interface circuit is isolated from the subscriber line circuit during the ringing phase, and is therefore not affected by the ringing voltage.

Ultimate protection that is achievable through the use of the said additional threshold setting elements may be augmented according to a further embodiment of the invention in that the previously indicated isolation switches, that are provided with reference to the tests, are realized through electronic components which exhibit a conducting resistance that is suitable for current limiting while in the conductive state.

A preferred embodiment of the invention is described with reference to the drawings.

DESCRIPTION OF THE PREFERRED EMBODIMENTS

Figure 1:
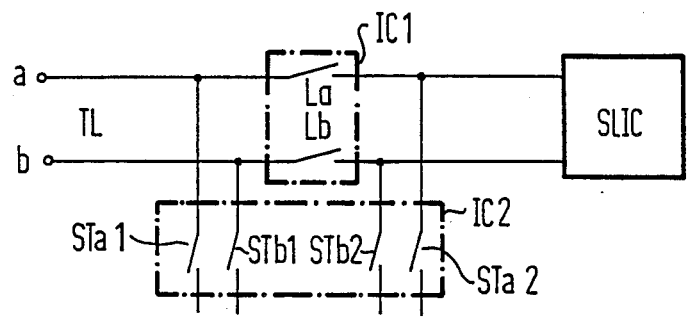
FIG. 1 is a schematic diagram of the test circuit in relation to a subscriber line circuit and the corresponding subscriber line interconnect circuit without a protective circuit.

Referring to FIG. 1, a subscriber line interconnect circuit serving the connection to a subscriber line circuit TL with a core pair a and b is designated by SLIC.

Test access switches STa1, STa2, and STb1, STb2, as well as isolation and/or series switches La and Lb, are provided in combination with test access to the subscriber line circuit and/or the subscriber line interconnect circuit SLIC. The core pair a and b of the subscriber line circuit TL may be isolated, separately or in common, from the connections to the subscriber line interconnect circuit SLIC with the aid of the series switches La and Lb.

The test access switches STa1 and STb1 are connected on the line side of the series switches La and Lb to the conductors of the core pair a and b of the subscriber line circuit and lead to devices, not shown, for performing the line tests. The test access switches STa2 and STb2 are connected, on the side of the series switches La and Lb facing the subscriber line interconnect circuit, to the conductors of the core pair of the subscriber line interface circuit and likewise lead to the said test facilities.

The indicated switches may be operated in any combination desired. When series switches La and Lb are open it is possible to test, separately, either the subscriber line circuit with the subscriber equipment connected thereto, or the subscriber line interconnect circuit via the access switches.

The said switches involve electronic switches which may, for example, be MOS-transistor pairs, in which the transistors are connected in opposition in order to block currents of both polarities, but they may also be Triac switches and/or combinations of Triac switches and MOS-transistors.

The subscriber line interconnect circuit SLIC, shown only in the form of a block diagram, includes an electronic interface circuit in which electronic circuit elements assume the functions of repeating coils and resistances similar to those provided in corresponding circuit locations in conventional subscriber line interconnect circuits.

The circuit elements of the interface circuit, as well as the electronic switches necessary in connection with testing, are endangered by external electrical influences, for example through lightning strikes or network contact, to which they may be subjected over the subscriber line circuit, and therefore require overvoltage protection with which the above described conditions are to be satisfied.

Figure 2:
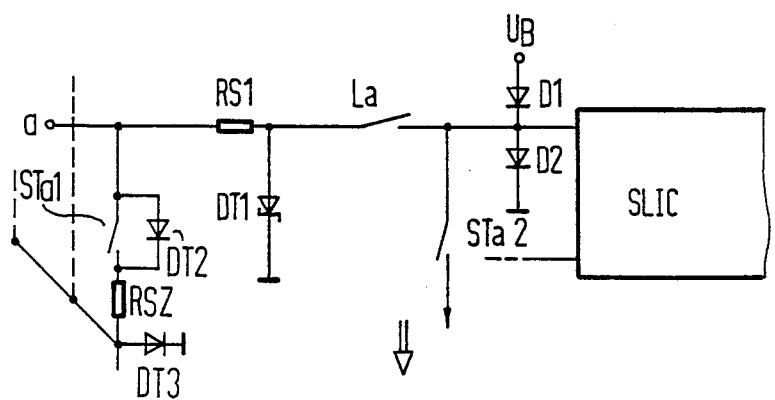
FIG. 2 is a protective circuit according to the invention as it relates to one conductor of a core pair of the subscriber line interconnect circuit and/or to an input to the subscriber line interconnect circuit.

FIG. 2 shows the part of the protective circuit according to the invention relates to a core pair of the subscriber line interconnect circuit and/or of the related part of the protective circuit according to the invention. This part of the protective circuit includes a relatively low ohmic resistance RS1 of approximately 50 ohms which is inserted between the connection of the access switch STa1 and the series switch La in the core pair conductor a, of the subscriber line circuit, as well as a thyristor diode DT1 (four region diode) serving as a threshold limiting switching element, that is connected between the connection of the resistance RS1 toward the subscriber line interconnect circuit SLIC and a grounded terminal of the circuit. A thyristor whose breakover potential may be adjusted through the introduction of a control current corresponding to the requirements may be employed in place of the thyristor diode.

An additional thyristor diode DT2 which bridges the access switch STa1 in the circuit is a part of the protective circuit, along with a series connected low ohmic resistance RSZ located in this circuit segment. Finally a third thyristor diode DT3 which is connected between the connection of the resistance RSZ away from the switch STa1 and a ground connected terminal of the circuit is provided as a third component of the protective circuit. The diode thyristor diodes DT2 and DT3 may be associated with a multiplicity of subscriber line interconnect circuits.

The part of the protective circuit according to the invention consisting of RS1 and the thyristor diode DT1 protects series switch La, the access switch STa2, as well as the electronic interface circuit of the subscriber line interconnect circuit SLIC against overvoltages, while the thyristor diode, which normally maintains its high resistance state, goes into its low resistance state upon the appearance of such overvoltages and thereby shunts the overvoltages to ground potential.

Because of its specific connection in the circuit, i.e,. between the access switch STa1 and the series switch La, the possibility exists of checking whether an interruption of current in the subscriber interconnect line is the result of a defect in the line itself, or instead, of damage to the resistance RS1. This is a consideration since the protective circuit and therewith also the resistance RS1, together with the subscriber line interconnect circuit SLIC is arranged as a plug-in component thus, upon establishing that the line current interruption is due to damage of the resistance RS1, it is only necessary to exchange this plug-in component to correct the defect.

This testing is carried out through test access via the test access switch STa1.

This type of testing is made possible in that the access switch STa1 is not included in the protective action of the thyristor diode DT1, for which reason the protective circuit according to the invention exhibits the said additional parts in the form of the thyristor diodes DT2, DT3 and the resistance RS2. These circuit elements form a low resistance discharge path to a grounded terminal in the circuit, by means of which the access switch STa1 is bridged and thereby protected, in the event that overvoltages should appear.

Depending on the type of ringing signal voltage supply, it may be required to set the response threshold of the protective circuit so high that the voltages reaching the electronic switches and the interface circuit may exceed their voltage breakdown. In view of these ringing signal voltages the test switches must have a correspondingly increased voltage breakover. The electronic circuit elements of the interface circuit are not endangered by the alternating ringing voltages, since during the "ringing" condition of operation the subscriber line interconnect circuit is isolated from the input supply for the alternating ringing voltage. In order that voltages, with amplitudes exceeding the tolerance limits of the components in the interface circuit, but still lying below the operating breakdown of the components of the protective circuit do not damage the components of the interface circuit, a further embodiment of the invention provides for the ultimate protection of the interface of the subscriber line interconnect circuit through an additional threshold setting element consisting of two diodes D1 and D2 between the access switch STa2 and the input of the interface circuit, in which the diode D1 is connected between the circuit supply voltage terminal and the input of the subscriber line interconnect circuit, and the other between this input and a grounded terminal of the circuit. The response threshold of this threshold setting element is correspondingly lower than that of the protective circuit described. This ultimate protection may be supplemented through the use of a circuit element for the series switch La, which exhibits a resistance suitable for current limiting, while in its conducting state.

What is claimed is:

1. A protective circuit for providing overvoltage protection of a subscriber line interconnect circuit of a digital time multiplex-communication network having an electronic interface circuit and for providing overvoltage protection of the electronic switches associated with the subscriber line circuit for test accessibility, comprising:

means providing for each conductor of a core pair of the connected subscriber line circuit for each corresponding connection of the subscriber line interconnect circuit an isolation of the separate conductors of the core pair from the connected subscriber line circuit;

a separate test access connection to the conductors of the core pair to the corresponding connections of the active subscriber line interconnect circuits;

a threshold setting element connected between the line side of an isolation switch and an access switch for each conductor of the core pair of the subscriber line circuit for accessing one conductor of the core pair, of identical construction to that of the threshold setting element associated with the other conductor of the core pair such that overvoltages are conducted to ground potential both via a grounded terminal of the circuit and through a second threshold setting element bridging said access switches for accessing one conductor of the the core pair, which is connected to ground potential via a third threshold setting element.

2. A protective circuit according to claim 1, wherein the third threshold setting element is provided in common with associated access switches, for a plurality of subscriber line circuits.

3. A protective circuit according to claim 2, wherein the component of the threshold setting element determining the response threshold is a thyristor.

4. A protective circuit according to claim 1, further comprising an additional threshold setting element connected to the subscriber line interconnect circuit side of the related access switch for accessing the subscriber line interconnect circuit, the response threshold of which is below the response threshold of the remaining threshold setting elements.

5. A protective circuit according to claim 4, wherein the isolation switches have a conduction resistance suitable for current limiting while in the conducting state.

* * * * *